United States Patent [19]

Craig et al.

[11] Patent Number: 5,795,602
[45] Date of Patent: Aug. 18, 1998

[54] MILK ENHANCER AND MILK FEED COMPOSITION

[75] Inventors: William Michael Craig, Monticello; David P. Casper, Elk River; Hank Esveld, Randolph, all of Minn.

[73] Assignee: Cargill, Incorporated, Minneapolis, Minn.

[21] Appl. No.: 629,947

[22] Filed: Apr. 12, 1996

[51] Int. Cl.[6] .................................................. A23C 11/10
[52] U.S. Cl. ............................. 426/2; 426/656; 426/807
[58] Field of Search ........................ 426/2, 585, 648, 426/656, 657, 807

[56] References Cited

U.S. PATENT DOCUMENTS

| | | | |
|---|---|---|---|
| 4,294,856 | 10/1981 | Kinumaki et al. | 426/7 |
| 4,378,376 | 3/1983 | Wagner et al. | 426/41 |
| 4,614,653 | 9/1986 | Kakade | 426/2 |
| 4,692,338 | 9/1987 | Irvine et al. | 426/807 |
| 4,961,934 | 10/1990 | Iwasaki et al. | 426/2 |
| 5,128,167 | 7/1992 | De Laporte | 426/807 |
| 5,296,243 | 3/1994 | Lange et al. | 426/656 |
| 5,372,811 | 12/1994 | Yoder | 426/656 |
| 5,413,803 | 5/1995 | Chung | 426/807 |

*Primary Examiner*—Christopher Upton
*Attorney, Agent, or Firm*—Fitch, Even, Tabin & Flannery

[57] ABSTRACT

The present invention is directed to a milk enhancer composition, a milk feed composition and a method for feeding infant cattle. The milk enhancer and milk feed compositions provide a feed composition that is reduced in fat and delivers balanced nutrition.

19 Claims, 2 Drawing Sheets

MILK ENHANCER AND MILK FEED COMPOSITION

The present invention relates to a milk enhancer composition and a milk feed composition, and a method for feeding infant animals. More particularly, the milk enhancer composition and the milk feed composition of the invention provide a feed composition which is reduced in fat, but also delivers balanced nutrition.

BACKGROUND OF THE INVENTION

The raising of young animals, particularly animals normally utilizing milk replacements, such as calves and swine, requires the feeding of milk or milk type products to replace the milk the young animal would normally receive from its mother. The time period from birth to weaning is a crucial period of a young animal's life, and many factors, especially feeding, can affect growth rates, health status, and survival. The sooner a young animal can start consuming dry feed, the sooner it will reach weaning, and the lower the incidence of death, health problems and disease will be.

Milk replacers are commonly used to feed calves. Products of this type are typically casein and whey mixtures with added amounts of fats, vitamins and minerals. The product is produced in dry form, for storage purposes, and can then be reconstituted in water prior to feeding the animal. However, heretofore known milk replacers are perceived as inferior to mother's milk in performance properties, as calves fed milk replacers have suffered from scours and poor health at higher feeding rates.

Cow's milk has generally been regarded as a good nutrient source for young calves (6 weeks old or less). Current estimates reveal that 40% to 60% of calves in the United States are fed whole milk even though economics favor selling the milk and purchasing a milk replacer. However, from a nutritional standpoint, whole milk has a number of short comings when calves are to be weaned at a young age. Whole milk contains about 28% to about 30% milk fat on a dry matter basis. High-fat intakes are known to limit calf starter intakes and growth rates.

It is therefore an object of the present invention to provide a milk enhancer composition and milk feed composition that is reduced in fat and provides balanced nutrition to infant animals.

Another object of the invention is to provide a milk enhancer composition and a milk feed composition that lowers the incidence of scouring (diarrhea), increases the amount of starter (dry feed) intake, decreases days to weaning and increases average daily weight gains.

A further object of the invention is to provide a method of feeding animals that normally utilize milk replacements that decreases the amount of milk fed, lowers the incidence of scouring, increases starter intake, decreases days to weaning and increases average daily weight gains.

Other objects, advantages, features and characteristics of the present invention will become more apparent upon consideration of the following description and appended claims.

SUMMARY OF THE INVENTION

The present invention is directed to a milk enhancer composition and to a milk feed composition and also to a method for feeding animals normally utilizing milk replacements. The milk enhancer composition, milk feed composition and feeding method of the invention provide economic advantages over feeding milk alone. The invention permits a decrease in the amount of milk fed and improves health and performance. The invention is an improvement over feeding whole milk because the invention lowers the incidence of scouring (diarrhea), increases the amount of starter (dry feed) intake, decreases days to weaning and increases average daily weight gains.

The milk enhancer composition and milk feed composition of the invention provide a feed composition which is reduced in fat, but also delivers balanced nutrition to the infant animal. The milk enhancer composition comprises a protein source and amino acids selected from the group consisting of lysine, methionine, threonine and mixtures thereof. The milk feed composition of the invention includes milk, water and the milk enhancer composition. The milk feed composition has milk, water and the milk enhancer composition in amounts effective for providing about 11 weight percent to about 20 weight percent fat, from about 15 weight percent to about 24 weight percent protein, from about 1.95 weight percent to about 3.18 weight percent lysine, from about 0.5 weight percent to about 0.8 weight percent methionine, and from about 0.95 weight percent to about 1.55 weight percent threonine, based on the weight of the milk feed composition on a dry product basis.

The milk enhancer is a supplement for milk that is blended with water and milk to provide an enhanced milk feed composition that has a lower fat content with sufficient levels of protein and amino acids. The milk feed composition is related to the composition of the milk blended with the milk enhancer. Accordingly, the composition of the milk enhancer may vary because of the nature of the milk used in the feed composition, but the enhancer includes at least protein and amino acids as described above. The milk enhancer composition may also include fat, depending upon the fat content of the milk in the feed composition. The composition of the milk enhancer composition generally includes from about 0 to about 10 weight percent fat, from about 10 to about 45 weight percent protein, from about 1.50 to about 5.50 weight percent lysine, from about 0.39 to about 1.40 weight percent methionine, and from about 1.25 to about 3.15 weight percent threonine, based on the weight of the milk enhancer composition.

The amino acids in the feed help to improve growth rates and animal health. Surprisingly, the reduced-fat content of the feed improves starter (dry feed) intake and weight gain. The addition of organic acids, probiotics or antibiotics to the milk composition improves gut health of calves, reduces the incidence of scouring and decreases the time to weaning.

The invention also provides a method of feeding animals normally utilizing milk replacements that decreases the amount of milk fed, lowers the incidence of scouring, increases starter intake, decreases days to weaning and increases average daily weight gains. In this aspect of the invention, from about 2 to about 6 pounds of milk, from about 2 to about 7 pounds of water, and from about 0.1 to about 0.5 pounds of milk enhancer are blended together and fed to the infant animal.

DETAILED DESCRIPTION OF THE INVENTION

Definitions

Figure 1:
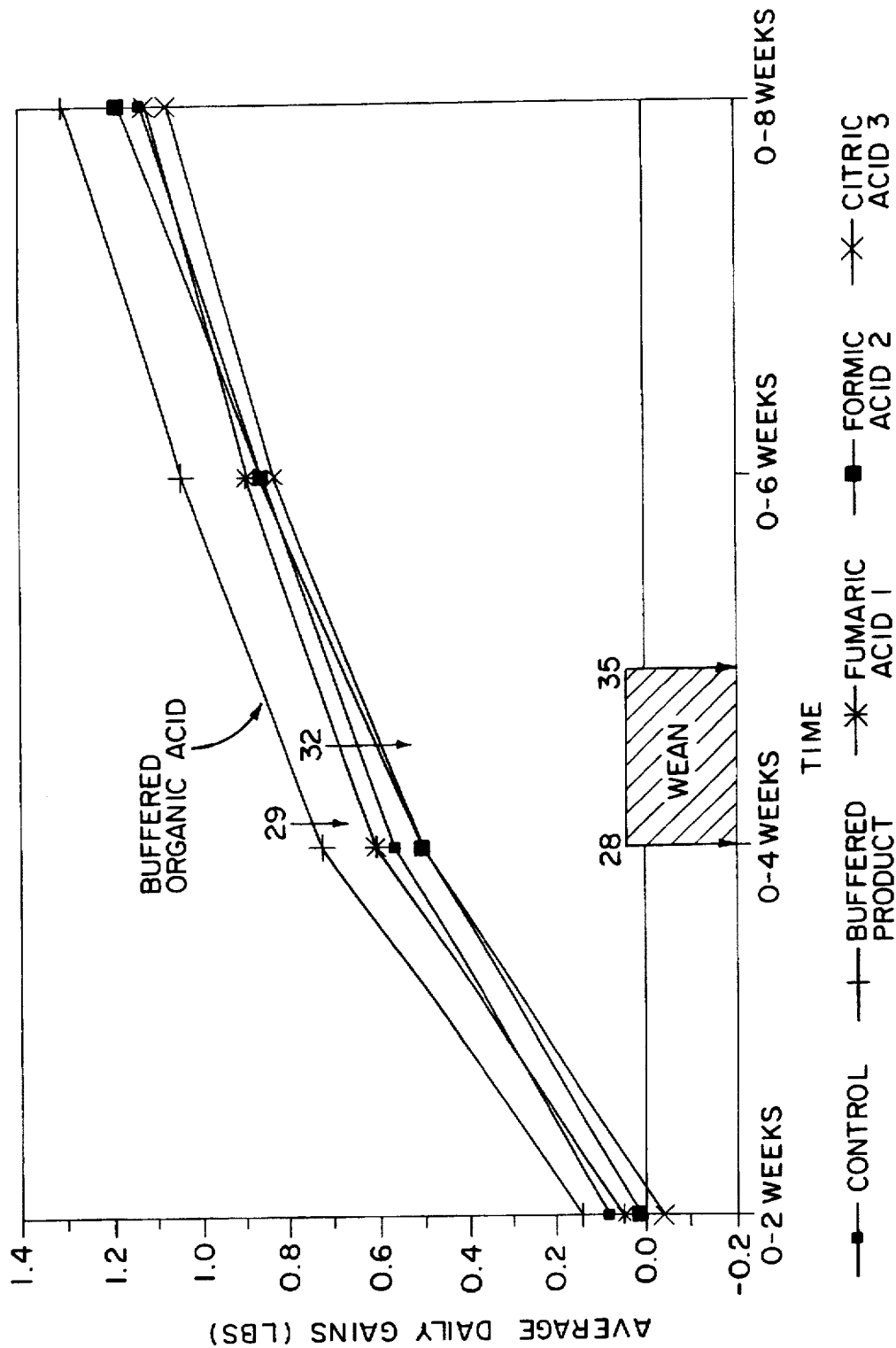
FIG. 1 shows the effect that inclusion of organic acids in the milk composition has on average daily weight gains and weaning times. Acid 1 is fumaric acid, Acid 2 is formic acid and Acid 3 is citric acid.

The milk enhancer and milk feed compositions of the invention are effective for feeding to animals normally utilizing milk replacements. Examples of such animals include calves and swine.

As used herein, "milk" includes whole milk, waste milk, skim milk and colostrum.

"Anti-scouring agent" means at least one organic acid and may further include probiotics, antibiotics and mixtures thereof.

"Organic acid" includes organic acids as well as buffered organic acids whose pH has been adjusted to a range from about 4 to about 7 with the addition of ammonium hydroxide, sodium hydroxide, or calcium and sodium salts.

"Reduced fat" means a milk feed composition having not more than about 20 weight percent fat, based on the weight of the milk feed composition.

Fat

It has been found that feeding high levels of fat to calves can reduce appetites, starter intake, delay gut development, and days to weaning, while increasing scours and scour days. Whole milk contains 28 to 30% milk fat on a dry basis. Feeding a high fat composition, such as whole milk, can reduce performance in the both the starter and grower phases.

In one aspect of the present invention, whole milk is mixed with water and milk enhancer. As a result of the dilution of the whole milk, the amount of fat in the milk feed composition fed to calves is reduced to about 11 to about 20 weight percent, based on the weight of the milk composition and on the fat content of the milk. Calves fed a milk composition according to the present invention having a lower concentrations of fat had less scouring, greater starter intakes, earlier weaning days and greater average daily gains than calves fed whole milk.

Fat sources can influence growth rates. In this aspect of the invention, all fat sources used in the milk composition are edible grade. Use of edible grade fat prevents addition of low quality ingredients and prevents the addition of ingredients having high microbial counts that may adversely effect gut health and contribute to scours. Fat sources used in the invention comprise edible fats including animal fats, vegetable fats, coconut oil and mixtures thereof. The fat may also include an edible emulsifier such as lecithin or polyoxyethylene glycol mono and diolates.

In another aspect of the invention, about 10 weight percent of the fat in the milk feed composition comes from coconut oil. Feeding coconut oil to calves increases average daily weight gains compared to calves fed choice white grease. While not intending to be bound by any theory, coconut oil has a fatty acid composition similar to milk fat. These fatty acids have a very high intestinal digestibility compared to choice white grease.

Protein

Protein source and concentrations utilized in the milk composition are effective to supply essential amino acids to the animal. Acceptable protein sources include dried whey protein concentrate, dried whey products, soy protein concentrate, commercial forms of soy protein concentrate such as Promoveal and Soycomil, dried skim milk, casein, potassium caseinate, sodium caseinate, dried whey, delactosed whey and mixtures thereof.

Protein concentrations in the milk composition are effective to reduce the ingredient costs, but still meet the animals protein requirement. The milk composition of the present invention which is fed to the animal has a protein concentration of from about 15 to about 24 weight percent, based on the weight of the milk composition. The milk enhancer that is mixed with water and added to a whole milk water mixture has a protein concentration of from about 10 to about 45 weight percent, based on the dry weight of the milk enhancer.

Amino Acids

Certain amino acids have been found to be important for growth in baby calves. Amino acids which are important for calf growth include lysine, methionine, and threonine. Effective amounts of the important amino acids are supplied to the milk feed composition through the protein ingredients described herein and/or by the addition of synthetic amino acids. Supplying important amino acids, while reducing overall protein concentration, reduces ingredient costs, but maintains product quality and results in aggressive weight gains in calves.

Tryptophan is desirably added in an amount effective for providing a milk feed composition with about 0.3 weight percent to about 0.50 weight percent tryptophan, based on the weight of the milk feed composition.

Anti-Scouring Agents

In an important aspect of the invention, the milk enhancer and milk feed further comprise an anti-scouring agent. When an anti-scouring agent is included, the milk enhancer composition comprises from about 0.05 weight percent to about 5 weight percent anti-scouring agent, based on the weight of the milk enhancer composition. When the milk feed composition includes an anti-scouring agent, the milk feed composition comprises from about 0.018 to about 1.80 weight percent anti-scouring agent, based on the weight of the milk feed composition on a dry weight basis.

Anti-scouring agents include at least one organic acid and may further include probiotics, antibiotics and mixtures thereof.

Organic Acids

The addition of at least one organic acid to the milk feed composition improves the gut health of calves, reduces the incidence of scouring and decreases the time to weaning. Organic acids that can be employed in the invention include citric acid, formic acid, fumaric acid, acetic acid, propionic acid and mixtures thereof.

In one aspect of the invention, the organic acid is buffered by adjusting the pH of the organic acid to a range of about 4 to about 7. The pH of the organic acid is adjusted with a base such as ammonium hydroxide or sodium hydroxide, or buffering salt.

In an important aspect of the invention, the organic acid component comprises about 1.0 weight percent citric acid, about 1.0 weight percent sodium acetate, about 6.0 weight percent mineral oil or equivalent oil, and about 92.0 weight percent calcium propionate, all based on the total weight of the buffered organic acid mixture. This component is then blended with the dry milk enhancer composition.

Inclusion of organic acids in the milk feed composition has a beneficial effect on average daily weight gains of calves. As described in FIG. 1, calves fed the milk feed composition with buffered organic acid had a higher average daily weight gain and maintained a greater average daily weight gain after weaning. Further, calves being fed a milk feed composition with buffered organic acid weaned faster (29 days) versus the control milk feed composition (32 days), which contained no organic acid, or the milk feed compositions containing one organic acid.

Figure 2:
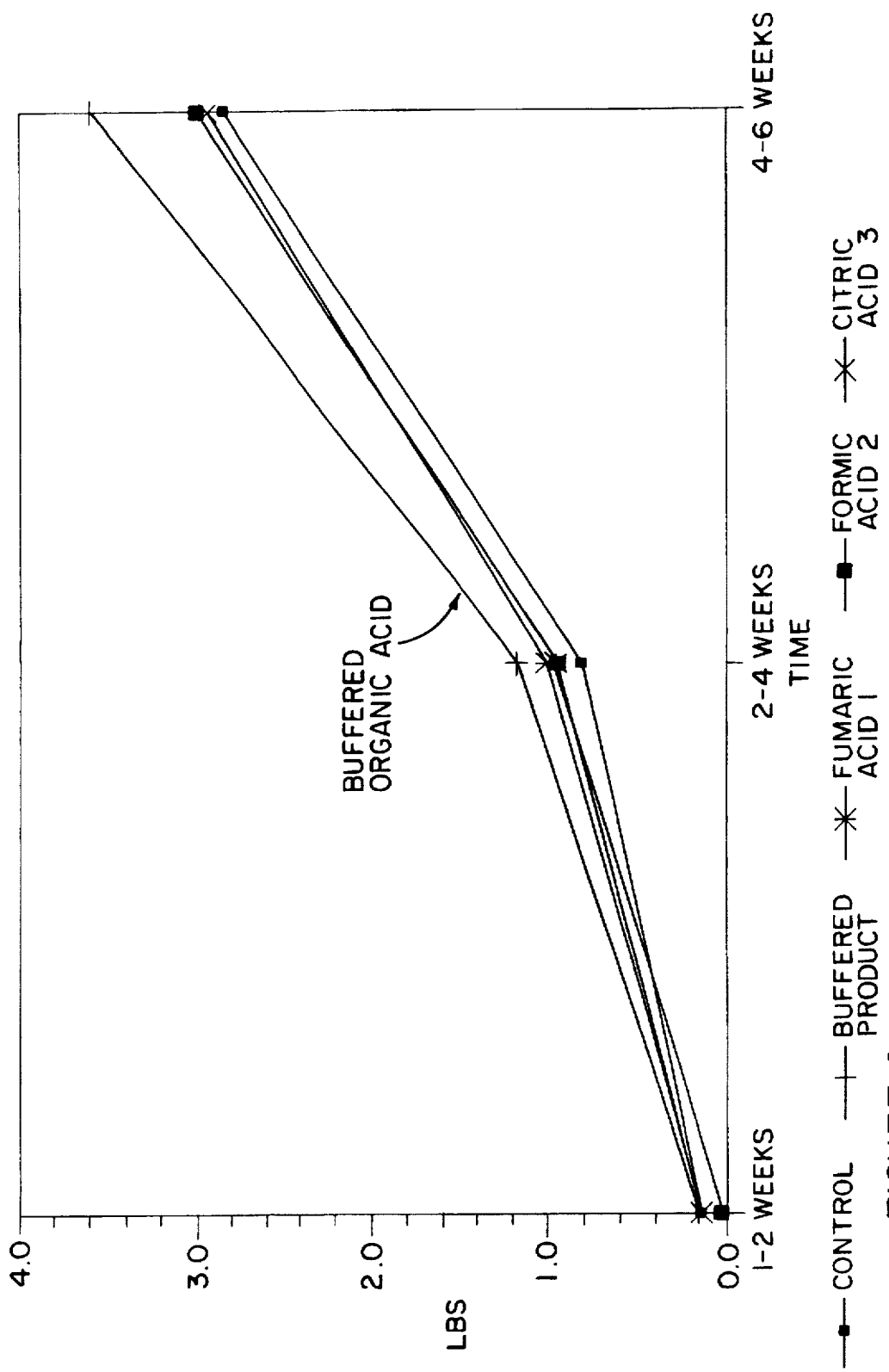
FIG. 2 shows the effect that inclusion of organic acids has on starter intakes. Acid 1 is fumaric acid, Acid 2 is formic acid and Acid 3 is citric acid.

Inclusion of organic acids in the milk feed composition also improved starter intake by the calf. As described in FIG. 2, calves fed the milk feed composition with buffered organic acid had greater starter intakes than calves fed the control milk feed composition, or the milk feed composition containing one organic acid.

Probiotics

In another aspect of the invention, probiotics are also added to the milk enhancer and milk feed compositions to improve the gut health of the animal. Probiotics include dried *Lactobacillus acidophilus ssp. gaseri* fermentation product, dried *Streptococcus faecium* fermentation product, dried *Saccharomyces cerevisiae* fermentation product, dried *Bacillus subtillus* fermentation product and mixtures thereof. The probiotic component may also include carriers such as dry yeast, whey, silicon dioxide, sodium sulfate, sodium aluminate, and vegetable oil.

Antibiotics

In another aspect of the invention, antibiotics are added to the milk enhancer and milk feed composition. Antibiotics employed in the invention include decoquinate, chlortetracycline, oxytetracycline, neomycin and mixtures thereof. The amount of antibiotic used varies according to the type of antibiotic. For example, decoquinate is added at a level of about 22.7 mg/100 lbs of body weight; chlortetracycline is added at a level of about 0.5 mg/lb of body weight; and the combination of oxytetracycline and neomycin is added at a level for providing between about 200 and about 400 mg per gallon of milk feed composition, respectively.

Vitamins

Vitamins are supplied to the milk feed composition at a concentration effective to meet or exceed the animal's nutritional requirements. Vitamins employed in the milk feed composition include Vitamins A, B, B12, C, D, E and K, biotin, folic acid, niacin, pantothenic, pyridoxine, riboflavin, thiamine, choline and mixtures thereof.

Minerals

In another aspect of the invention, effective amounts of minerals are supplied to the milk feed composition at a concentration effective to supply the animals nutritional requirements for macro nutrients and trace minerals. Minerals utilized in the milk feed composition include calcium, phosphorous, sodium, magnesium, potassium, chloride, cobalt, copper, iodine, zinc, iron, manganese, selenium and mixtures thereof.

In one aspect of the invention, vitamins and minerals are provided as a vitamin and mineral premix. The premix may include vitamin A acetate, vitamin D3 supplement, vitamin E supplement, ascorbic acid, choline chloride, vitamin B12 supplement, Menadione dimethyl pyrimidinol bisulphite, calcium pantothenate, pyridoxine hydrochloride, riboflavin, folic acid, thiamine mononitrate, biotin, ethylenediamine dihydriodide, choline chloride, calcium carbonate, dicalcium phosphate, magnesium sulfate, manganese sulfate, zinc sulfate, sodium selenite, calcium carbonate, dicalcium phosphate, copper sulfate, ferrous sulfate, cobalt sulfate, calcium iodide and potassium chloride.

The milk enhancer composition of the invention includes the various components set forth below.

| Nutrient | % Concentration Range | % Preferred Amount |
| --- | --- | --- |
| Crude Protein | 10–45 | 25 |
| Fat | 0–10 | 5 |
| Lysine | 1.50–5.50 | 2.40 |
| Methionine | 0.39–1.40 | 0.60 |
| Threonine | 1.25–3.15 | 1.65 |
| Tryptophan | 0.25–0.90 | 0.40 |
| Anti-Scouring Agents | 0.05–5.00 | 2 |

Percents are calculated on a dry product basis

The milk feed composition of the invention includes the various components as set forth below.

| Nutrient | % Concentration Range | % Preferred Amount |
| --- | --- | --- |
| Crude Protein | 15–24 | 20 |
| Fat | 11–20 | 15 |
| Lysine | 1.95–3.18 | 2.65 |
| Methionine | 0.50–0.80 | 0.66 |
| Threonine | 0.95–1.55 | 1.26 |
| Tryptophan | 0.30–0.50 | 0.42 |
| Anti-Scouring Agents | 0.018–1.80 | 0.75 |

% are calculated on a dry product basis

Preparation of the Milk Feed Composition

The milk feed composition of the invention that is fed to calves is prepared by mixing milk with water and milk enhancer. In this aspect of the invention, from about 2 to about 6 pounds milk is mixed with about 2 to about 7 pounds water, and from about 0.1 to about 0.5 pounds milk enhancer. In an important aspect of the invention whole milk or waste milk, water and milk enhancer are mixed together at about 102° F. and then fed to the calf.

An example formulation of the milk enhancer composition is as follows.

| Ingredient | % of Mix |
| --- | --- |
| Dried whey | 39.70 |
| Whey protein concentrate (34% crude protein) | 44.95 |
| Whey protein concentrate (80% crude protein) | 5.65 |
| Edible Fats and coconut oil | 3.90 |
| Dried Skim Milk | 1.00 |
| Caseinate | 0.10 |
| L-lysine | 0.22 |
| DL-methionine | 0.05 |
| L-threonine | 0.04 |
| L-tryptophan | 0.01 |
| Anti-scouring agent/organic acid mixture | 2.00 |
| Flavor | 0.01 |
| Mineral and vitamin premix | 2.37 |

Feeding Guidelines

Calves will consume between about 0.75 and about 1.2 pounds of the milk feed composition, on a dry product basis, per day. In this aspect of the invention, calves are fed the milk feed composition twice a day in an amount that provides about 0.3 pounds of milk enhancer, about 5 pounds of water and about 4 pounds of milk per calf per day. Calves are typically fed about 8 to 10 pounds of milk per day, hence, the present invention provides a significant savings in terms of reduction in the amount of milk fed.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A milk enhancer composition for mixing with milk to provide a milk feed composition having a fat content not more than about the fat content of the milk with which the enhancer is mixed, and enhanced levels of protein and amino acids relative to the milk with which the enhancer is mixed, the milk enhancer comprising:

from about 10 to about 45 weight percent protein;
from about 0 to about 10 weight percent fat;
from about 1.5 to about 5.5 weight percent lysine;
from about 0.39 to about 1.40 weight percent methionine; and
from about 1.25 to about 3.15 weight percent threonine, based on the weight of the milk enhancer composition, the milk enhancer composition when mixed with milk effective for providing a milk feed composition having enhanced levels of protein and amino acids relative to the milk with which the enhancer is mixed.

2. The composition of claim 1, wherein the composition further includes from about 0.05 weight percent to about 5 weight percent anti-scouring agent, based on the weight of the milk enhancer composition.

3. The composition of claim 2, wherein the anti-scouring agent includes at least one organic acid.

4. The composition of claim 3, wherein the organic acid is selected from the group consisting of citric acid, formic acid, fumaric acid, acetic acid, propionic acid and mixtures thereof.

5. The composition of claim 1, wherein the organic acid is buffered to a pH of between about 4 and about 7.

6. A milk enhancer composition as recited in claim 4 wherein the milk enhancer composition when mixed with milk is effective for providing from about 11 weight percent to about 20 weight percent fat, from about 15 weight percent to about 24 weight percent protein, from about 1.95 weight percent to about 3.18 weight percent lysine, from about 0.5 weight percent to about 0.8 weight percent methionine, and from about 0.95 weight percent to about 1.55 weight percent threonine, based on the weight of the milk feed composition on a dry weight basis.

7. The composition of claim 3, wherein the anti-scouring agent further comprises probiotics, antibiotics and mixtures thereof.

8. A milk enhancer composition as recited in claim 3 wherein the milk enhancer composition when mixed with milk is effective for providing from about 11 weight percent to about 20 weight percent fat, from about 15 weight percent to about 24 weight percent protein, from about 1.95 weight percent to about 3.18 weight percent lysine, from about 0.5 weight percent to about 0.8 weight percent methionine, and from about 0.95 weight percent to about 1.55 weight percent threonine, based on the weight of the milk feed composition on a dry weight basis.

9. The composition of claim 1, wherein the composition further comprises from about 0.25 to about 0.90 weight percent tryptophan, based on the weight of the milk enhancer composition.

10. A milk enhancer composition as recited in claim 9 wherein the milk enhancer composition when mixed with milk is effective for providing from about 11 weight percent to about 20 weight percent fat, from about 15 weight percent to about 24 weight percent protein, from about 1.95 weight percent to about 3.18 weight percent lysine, from about 0.5 weight percent to about 0.8 weight percent methionine, and from about 0.95 weight percent to about 1.55 weight percent threonine, based on the weight of the milk feed composition on a dry weight basis.

11. The composition of claim 1, wherein the protein is provided from a protein source selected from the group consisting of dried whey protein concentrate, dried whey product, soy protein concentrate, dried skim milk, casein, potassium caseinate, sodium caseinate, dried whey, delactosed whey and mixtures thereof.

12. A milk enhancer composition as recited in claim 11 wherein the milk enhancer composition when mixed with milk is effective for providing from about 11 weight percent to about 20 weight percent fat, from about 15 weight percent to about 24 weight percent protein, from about 1.95 weight percent to about 3.18 weight percent lysine, from about 0.5 weight percent to about 0.8 weight percent methionine, and from about 0.95 weight percent to about 1.55 weight percent threonine, based on the weight of the milk feed composition on a dry weight basis.

13. The composition of claim 1, wherein the fat is an edible fat selected from the group consisting of animal fat, vegetable fat, coconut oil and mixtures thereof.

14. The composition of claim 13, wherein the milk enhancer is effective for providing a milk feed composition having about 10 weight percent of the fat coming from coconut oil.

15. A milk enhancer composition as recited in claim 14 wherein the milk enhancer composition when mixed with milk is effective for providing from about 11 weight percent to about 20 weight percent fat, from about 15 weight percent to about 24 weight percent protein, from about 1.95 weight percent to about 3.18 weight percent lysine, from about 0.5 weight percent to about 0.8 weight percent methionine, and from about 0.95 weight percent to about 1.55 weight percent threonine, based on the weight of the milk feed composition on a dry weight basis.

16. A milk enhancer composition as recited in claim 13 wherein the milk enhancer composition when mixed with milk is effective for providing from about 11 weight percent to about 20 weight percent fat, from about 15 weight percent to about 24 weight percent protein, from about 1.95 weight percent to about 3.18 weight percent lysine, from about 0.5 weight percent to about 0.8 weight percent methionine, and from about 0.95 weight percent to about 1.55 weight percent threonine, based on the weight of the milk feed composition on a dry weight basis.

17. The composition of claim 1, wherein the composition further includes vitamins and minerals.

18. The composition of claim 1, wherein the composition comprises about 25 weight percent protein, about 5 weight percent fat, about 2.4 weight percent lysine, about 0.60 weight percent methionine, about 1.65 weight percent threonine, about 0.40 weight percent tryptophan and about 2 weight percent buffered organic acid, based on the weight of the milk enhancer composition.

19. A milk enhancer composition as recited in claim 1 wherein the milk enhancer composition when mixed with milk is effective for providing from about 11 weight percent to about 20 weight percent fat, from about 15 weight percent to about 24 weight percent protein, from about 1.95 weight percent to about 3.18 weight percent lysine, from about 0.5 weight percent to about 0.8 weight percent methionine, and from about 0.95 weight percent to about 1.55 weight percent threonine, based on the weight of the milk feed composition on a dry weight basis.

* * * * *

UNITED STATES PATENT AND TRADEMARK OFFICE
CERTIFICATE OF CORRECTION

PATENT NO. : 5,795,602
DATED : August 18, 1998
INVENTOR(S) : William M. Craig et al.

It is certified that error appears in the above-indentified patent and that said Letters Patent is hereby corrected as shown below:

Column 7, line 41, change "claim 1" to -- claim 4 --.

Signed and Sealed this

Fifteenth Day of December, 1998

Attest:

BRUCE LEHMAN

*Attesting Officer*     Commissioner of Patents and Trademarks